UNITED STATES PATENT OFFICE.

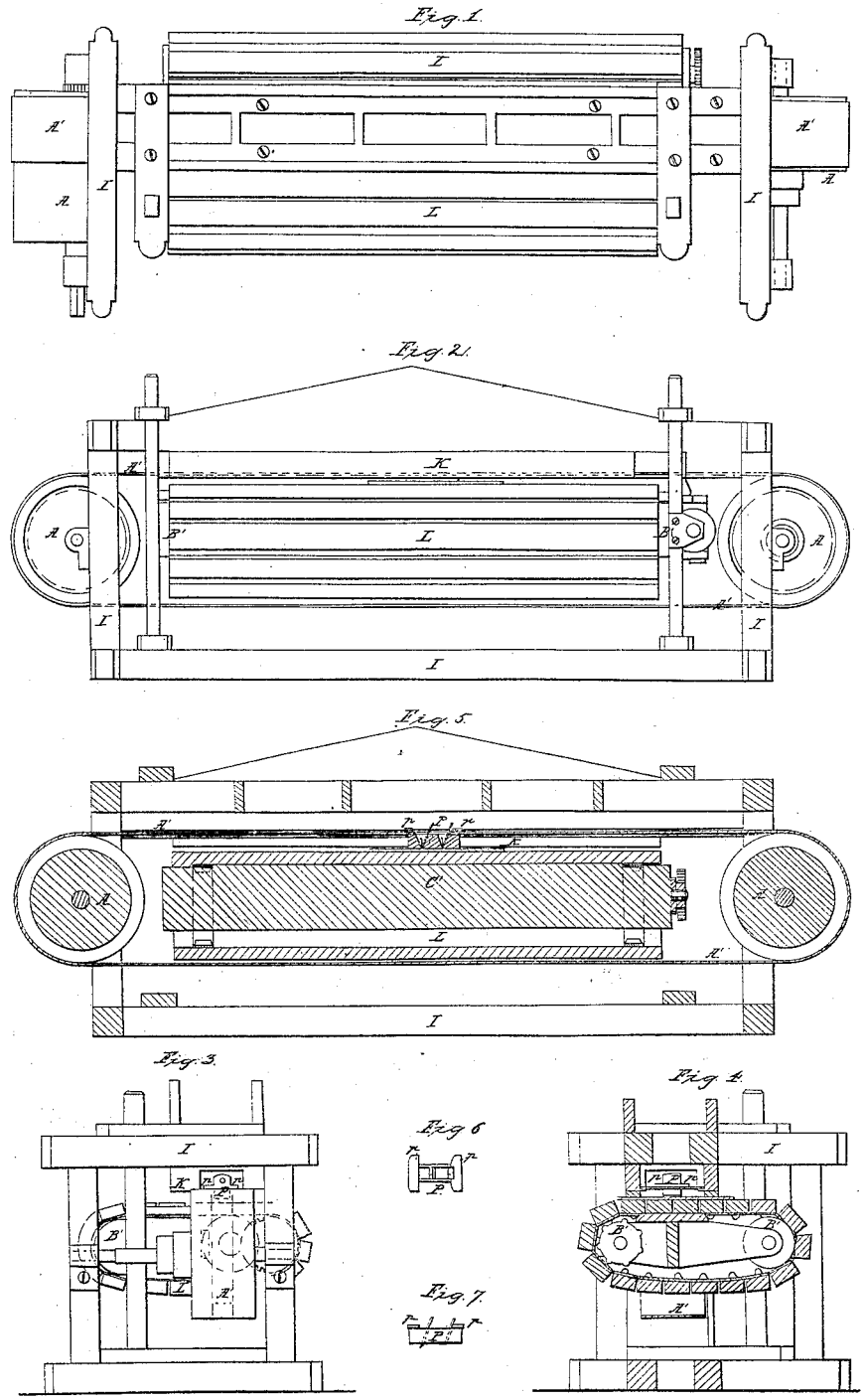

HUDSON OSGOOD, OF WATERVILLE, MAINE.

PLANING-MACHINE.

Specification of Letters Patent No. 16,185, dated December 9, 1856.

*To all whom it may concern:*

Be it known that I, HUDSON OSGOOD, now or late of Waterville, in the county of Kennebec and State of Maine, have invented a new and useful Improvement in Machinery for Planing Boards; and I do hereby declare that the same is fully described and represented in the following specification and the accompanying drawings, of which—

Figure 1, is a top view of my improved machine. Fig. 2, a front elevation. Fig. 3, an end view or elevation. Fig. 4 a transverse and vertical section. Fig. 5, a longitudinal and vertical section of it.

When a board is to be planed in or by said machine, such board is to be on, and be fed or moved sidewise by a traveling endless bed of slats, which I term a lag table, it being shown at L, in said figures, the board being kept down thereon by a frame or holder K, arranged over the table. The board thus sustained and fed along is at the same time subjected to the reducing of one or more planes P, applied to an endless belt A', revolving around and supported by drums B' B', as seen in the drawings. This peculiar arrangement and mode of operation of the board and planes causes the board to be reduced by a "drawing cut" and with an easy action on the part of the planes. Besides this the finish of the board is better than when the cut is made in a line either parallel or at right angles to its longitudinal edge. The cut made by each of the planes of my machine, is diagonal or anglewise on the surface of the board. The endless table, L, should be made to present a flat surface when the board is supported by it, and for this purpose, it may travel on a firm and stationary under bed C', or its equivalent, that the board may not bend or yield or be deflected out of place while it is being planed. In order to regulate the thickness of the board, the bed L, of traveding slats may have suitable adjustments, by which the distance of its top surface from the path of movement of the planes may be regulated as occasion may require. The plane-irons themselves may be set in stocks made fast to the endless belt, A', and such stocks should be provided with suitable ears or guides to enter and move in grooves or their equivalents properly arranged in the frame work, and so as to guide the planes over the board or table supporting the same, the said ears being shown at p, p, in Figs. 6, and 7, which are top and side views of one of the plane stocks, the grooves for the reception of said ears being represented in Figs. 4, and 5. These planes for ordinary work may consist for the most part of roughing planes arranged one in advance of the other, while with them smoothing planes may be used for the purpose of smoothing and finishing the surface that may be reduced.

The frame of the machine which is shown at, I, should be properly constructed to sustain the operative parts and enable them to move with steadiness; and when such operative parts are properly constructed and are arranged so as to operate substantially as herein before specified, the planing of boards or timber for various purposes may be accomplished to much advantage.

I do not claim an endless belt and planing cutters arranged together so that their planes of rotation or movement may be in the same direction, as in my machine, they are arranged so as to cross or stand at right angles to one another, but What I do claim is—

My improved arrangement, of the endless bed and the belt of planes substantially as specified, that is so that when a board is being planed by such it shall be moved transversely under the planes, and the planes be drawn longitudinally over and against its surface.

In testimony whereof, I have hereunto set my signature.

HUDSON OSGOOD.

Witnesses:
 A. L. SIMPSON,
 GEO. D. HUMMER.